Oct. 23, 1934.                L. J. STEVENS                1,977,957
                       BUS BAR AND BUSHING CONNECTION
                            Filed Feb. 4, 1930
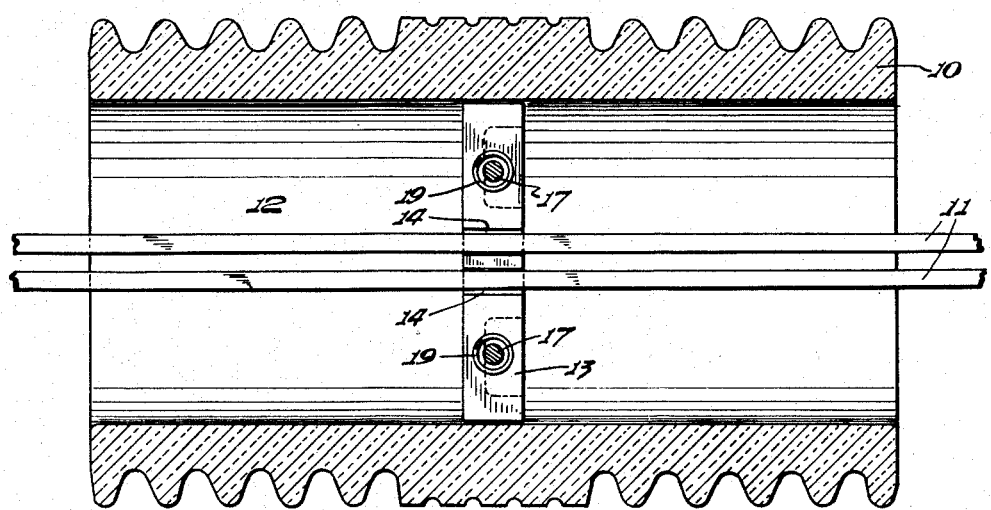
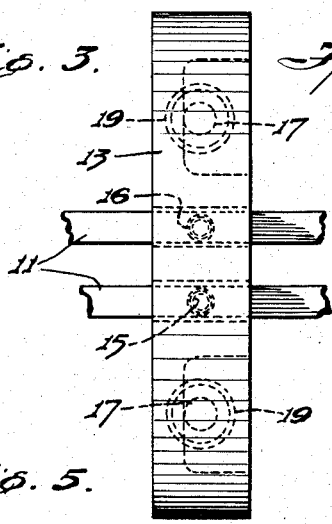
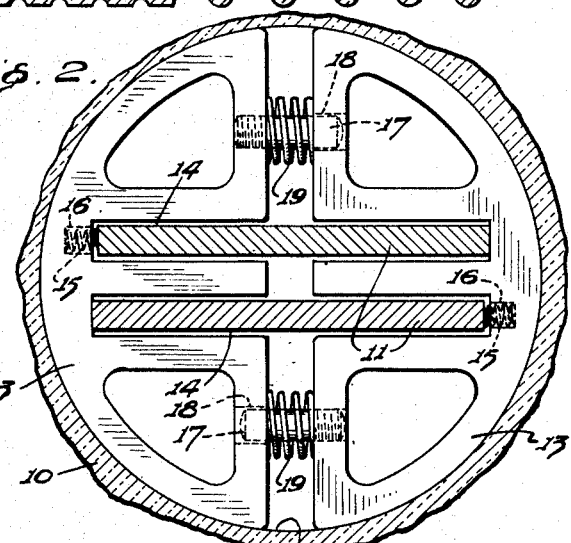
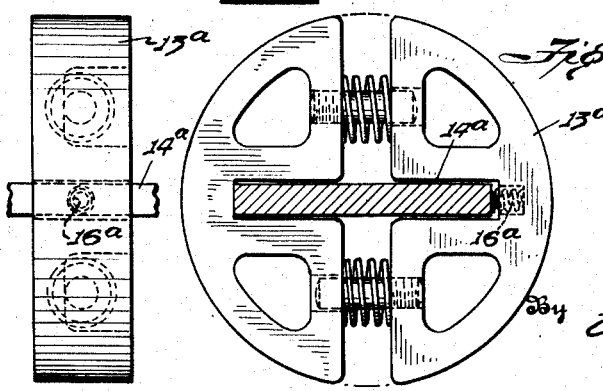
Inventor
L. J. Stevens
By Ernest H. Mechlin
Attorney Patented Oct. 23, 1934

1,977,957

UNITED STATES PATENT OFFICE 1,977,957

BUS BAR AND BUSHING CONNECTION

Leland J. Stevens, Baltimore, Md., assignor to Locke Insulator Corporation, Baltimore, Md., a corporation of Maryland Application February 4, 1930, Serial No. 425,907

9 Claims. (Cl. 173—318)

The invention relates to connections between bus bars and bushings.

It is well known that it is desirable to make an electrical contact between a bus bar passing through a bushing and a conducting surface on the inside of the bushing in order that corona formation and subsequent splitting of the bushing will be avoided. The fundamental principle of connecting an energized bus bar with the side wall of a bushing is neither new nor unique and the proposition need therefore not be discussed in minute detail. It is also known that it is desirable to support a bus bar mechanically within and with respect to the bushing through which it passes so that it will be adequately supported and properly centered.

It is with the above facts in view that I have devised the present invention which has for its general object the provision of a novel insert adapted to be placed within a wall or other similar bushing in electrical and physical contact therewith and also in mechanical and electrical engagement with the bus bar or bars.

An important object of the invention is to provide an insert of this character which will closely frictionally engage the inner surface of the bushing, regardless of slight variations in the diameter thereof and which will also have proper and perfect contact with the bus bar or bars even though they may vary in their dimensions.

Another object of the invention is to provide a device of this character which when inserted will remain in place without any necessity for the employment of auxiliary or extraneous fastening means, friction being the sole force relied upon.

An additional object is to provide a device of this character which will be simple and inexpensive to make, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a longitudinal section through a wall bushing and through my device showing it in place for holding a pair of bus bars, Figure 2 is a side elevation of the device with the bushing and bus bars in section, Figure 3 is an edge view, Figure 4 is a view similar to Figure 2 showing the device constructed to hold just one bus bar, and Figure 5 is an edge elevation thereof.

Referring more particularly to the drawing, the numeral 10 designates a wall or other similar bushing within which it is desired to mount one or more bus bars indicated at 11. It is well known that it is an ordinary practice to provide the wall of the bore 12 of the bushing with some sort of coating which will be a conductor and it is equally well known that it is desirable to connect the bus bar electrically with such coating. In carrying out my invention I provide a combined connecting and mounting means comprising a pair of preferably similar substantially semicircular or semicylindrical members 13 having a periphery corresponding substantially to the bore of the bushing. These members have their confronting edges plane and formed with alining recesses 14 which mate to define slots for the passage of the bus bars 11 with which electrical contact is assured by means of springs 15 located within sockets 16 in the body members and bearing against some convenient portion of the bus bars, for instance, an edge as shown. It is intended that the assembled members 13 fit snugly within the bushing and for this reason I have shown their confronting edges as provided with guide pins 17 slidable within openings 18 and surrounded by coil springs 19 which abut against the opposing edges of the body members. It will be observed that it is a convenient plan that each body member positively carry one of the guide pins which may be screwed into a suitable tapped hole, the arrangement being such that the members 13 are counterpart.

In some instances there is only one bus bar to be mounted and in such an event the body members 13ª need be provided each with a single recess 14ª and a single spring 16ª to take care of the one bus bar, the construction being identically the same in every other respect.

In the use of the device, it will be apparent that the springs 19 urging the body members apart will hold the curved peripheral portions thereof in close frictional engagement with the wall of the bore in the bushing. Furthermore the springs 16 will insure proper contact of the bus bars with the body members and as the body members are necessarily of conducting material there will be perfect electrical contact between the bus bars and the bushing so that corona will be avoided. In addition it is quite easily seen that this insert provides an adequate mechanical mounting for the bus bar or bars so that it or they will be held in the proper substantially coaxial relation to the bushing without the employment of any auxiliary or extraneous securing means.

From the foregoing description and a study of the drawing it will be apparent that I have thus provided a very simply constructed, inexpensive and easily installed device for the purpose specified which will efficiently perform all the functions for which it is intended. It is thought that the construction, operation and advantages will be clear to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Means for mounting a bus bar within a bushing, comprising relatively movable members arranged in substantially surrounding relation to the bus bar and frictionally engaging the wall of the bore of the bushing, and spring means engaging the bus bar for insuring electrical contact thereof with the expansible members.

2. Means for mounting a bus bar within a bushing, comprising a plurality of members recessed for engagement upon the bus bar, and spring means urging said members apart into frictional engagement with the wall of the bore of the bushing.

3. Means for mounting a bus bar within and electrically connecting it with the conducting wall of the bore of an insulator, comprising a plurality of conducting members adapted to be embracingly engaged with a bus bar, means carried by said members adapted to frictionally engage the bus bar to establish electrical connection therewith, and means urging said members into engagement with said conducting wall.

4. Means for electrically connecting a bus bar with a conducting coating on the wall of the bore of a bushing through which the bus bar passes, comprising a sectional spring pressed expansible conducting member adapted to be arranged in substantially surrounding relation to and in electrical contact with the bus bar and adapted to be frictionally engaged with the wall of the bore.

5. In combination with a bus bar within an insulator bushing, a plurality of conducting members extending about the bus bar and in electrical connection therewith, and spring means interposed between said members for urging them apart and into engagement with the bore of the insulator.

6. In combination with a bus bar and a bushing insulator through which it extends, a plurality of conducting members in electrical connection with the bus bar and substantially surrounding the same, coacting guides carried by said members, and spring means urging said members apart.

7. Means for mounting a bus bar within an insulator bushing through which it extends, comprising a pair of counterpart conducting members each adapted to extend partly about the bus bar, guide means carried by each of said members, and spring means surrounding the guide means for urging said members apart.

8. The combination of a bushing with a conducting inner surface, a conductor extending through the bushing in spaced relation to said surface, and means for mounting the conductor and maintaining it in electrical connection with said conducting surface, comprising metallic members engaged partly about the conductor and recessed for the accommodation thereof, resilient means carried by said members and engaging the conductor for insuring electrical connection therebetween, and means interposed between and urging said members into physical and electrical contact with said conducting surface.

9. Means for mounting a conductor within an insulating bushing, comprising a pair of guidably connected metallic members provided at their confronting faces with recesses adapted to be engaged upon the conductor, spring elements located within said members adapted to engage the conductor, and other spring elements interposed between said members for urging them apart whereby said members will be adapted to closely engage the inner surface of the bushing.

LELAND J. STEVENS.